April 5, 1960
E. B. JACOBSON
2,931,245
REMOTE CONTROL DEVICE, PARTICULARLY FOR
AN AUTOMOTIVE REARVIEW MIRROR
Filed Nov. 29, 1957
4 Sheets-Sheet 2
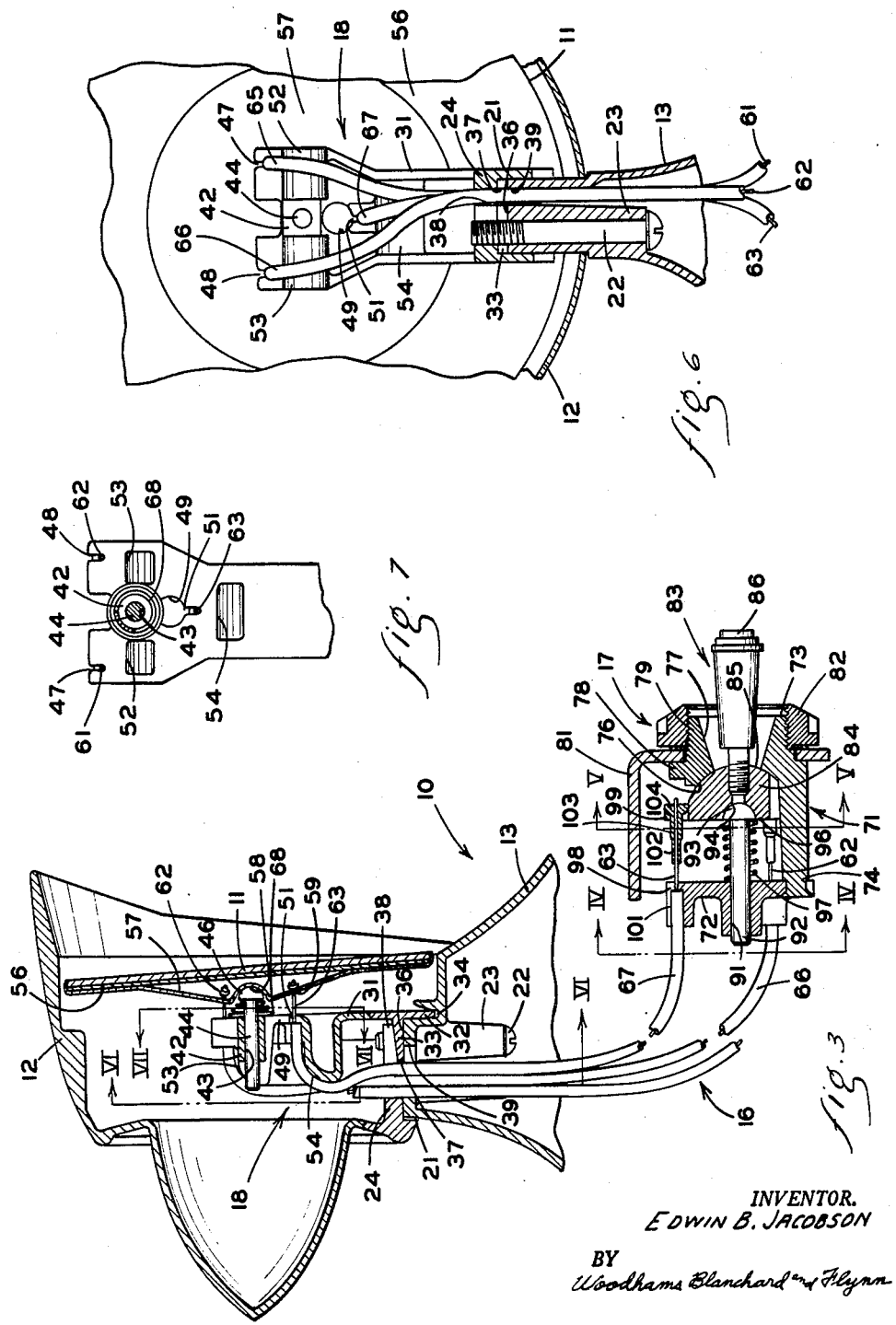
INVENTOR.
EDWIN B. JACOBSON
BY
Woodhams Blanchard and Flynn
ATTORNEYS April 5, 1960

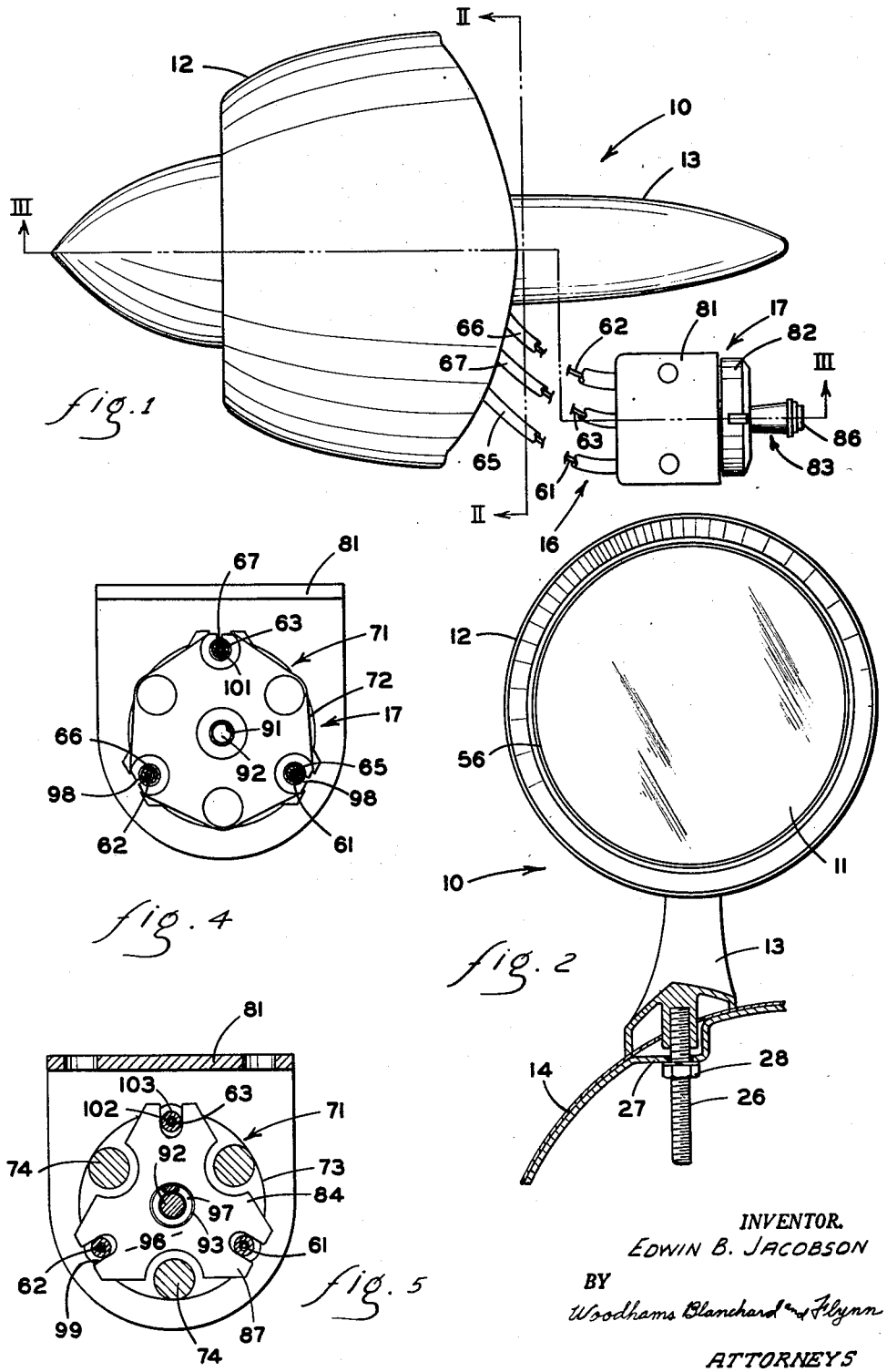

E. B. JACOBSON 2,931,245

REMOTE CONTROL DEVICE, PARTICULARLY FOR
AN AUTOMOTIVE REARVIEW MIRROR

Filed Nov. 29, 1957

INVENTOR.
EDWIN B. JACOBSON
BY
Woodhams Blanchard and Flynn

ATTORNEYS

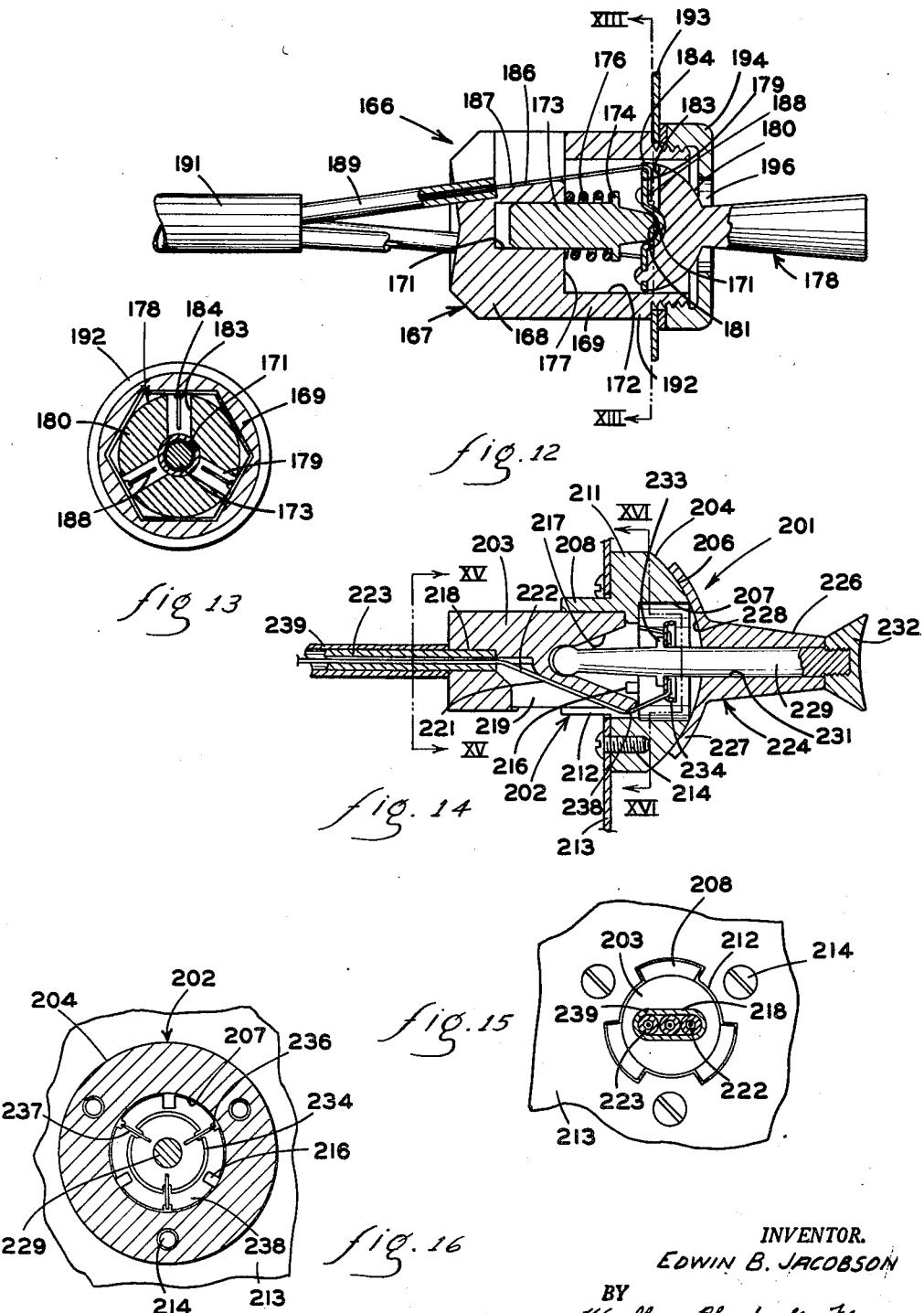

United States Patent Office 2,931,245
Patented Apr. 5, 1960

2,931,245

REMOTE CONTROL DEVICE, PARTICULARLY FOR AN AUTOMOTIVE REARVIEW MIRROR

Edwin B. Jacobson, Grand Rapids, Mich., assignor to Jervis Corporation, Grandville, Mich., a corporation of Michigan Application November 29, 1957, Serial No. 699,607

24 Claims. (Cl. 74—501)

This invention relates to a three-wire remote control device and particularly to such a device adaptable for controlling from the instrument panel of an automotive vehicle a rearview mirror mounted outside of the driver's compartment, such as on the front fender of an automobile.

While rearview mirrors have been extremely common in automotive and other similar usages and have been used in a wide variety of circumstances for many years, there have been numerous disadvantages in the use of each of the mirrors commonly employed. For example, the usual mirror positioned in front of the driver and within the passenger compartment is readily adjustable by the driver but provides a limited view, at best, of the road behind the car and particularly fails to give the driver any view at all of the portion of the road immediately behind and to the left of the car. Furthermore, the rearview provided by an inside mirror is frequently, though unintentionally, blocked more or less completely by occupants of the passenger compartment. Many attempts have been made to correct this situation, as by providing mirrors outside of the driver's compartment, some of which are placed on arms secured to, and extending sidewardly from, the automobile body near the driver's compartment. Other mirrors have been mounted on either the right-hand or the left-hand fender of the vehicle, depending upon the use intended. The mirrors, which are mounted closed to the driver's compartment, at least those mounted on the left-hand side of the vehicle, can usually be manually adjusted by the driver, but this often requires the opening of a window or door, which can be unpleasant in cold or other inclement weather. Furthermore, such mounting of the mirror is often too close to the side of the car for good visibility. On the other hand, when the mirror is mounted further forward on the vehicle, where it is easier to see and safer to use, it cannot be adjusted by the driver without stopping the vehicle and leaving the driving position. Where as is common, the vehicle is driven by two or more persons, differences in their physical characteristics and preferences may necessitate that the mirror position be changed for each driver. As is well known, it is very difficult for one person alone to properly reposition a fender mounted mirror which is not remotely controllable, and usually requires several trial and error attempts to obtain even fair adjustment.

Therefore, attempts have in the past been made to provide remotely controlled rearview mirrors and some of these have been utilized commercially, but with only indifferent success. Various kinds of positive remote control mechanisms, such as gearing, have been tried but without satisfactory commercial success because of the high cost. Other less expensive controls have been tried but have been insufficient either in strength of construction or in stability of use to be entirely acceptable.

Another problem which pertains particularly to an automotive rearview mirror, but which also has a wider applicability, arises from the inability of existing rearview mirrors, both with and without remote control, to yield to an externally imposed force and then, when the force is removed, return to their previous positions. For example, even a small amount of force, such as that applied in cleaning such mirrors, will often move them out of adjustment. Where the externally applied force is abrupt or excessive, breakage may occur, particularly where the mounting is somewhat rigid. Furthermore, vibrations developed in the vehicle and transmitted to the mirror mounting usually distort the image temporarily and often cause the mirror to move completely out of adjustment. Even where the mirror is close to the driver the necessary readjustment is inconvenient at best.

It has also been found that existing mirror mountings are arranged so that vibrations transmitted thereto often produce a substantially simple harmonic movement of the mirror with the desired adjusted position being approximately midway between the dwells of said harmonic movement. Accordingly, the mirror is located for a minimum period of time at its desired position and for a maximum of time at its most undesired positions, namely, where the dwells occur at the ends of the several oscillations.

Therefore, in pursuance of constant efforts to improve equipment of this general type, the present invention contemplates a remotely controllable rear view mirror primarily adaptable for use with automotive vehicles, said mirror being economical to manufacture, capable of having an attractive, customer-pleasing appearance, strong enough to withstand the usual shocks and vibrations produced by ordinary automotive use and sufficiently stable when in an adjusted position to remain as placed by the operator through all ordinary conditions of use.

Accordingly, a principal object of the invention has been to provide a remote control mechanism, which is particularly adaptable for operating the rearview mirror of an automotive vehicle, which is capable of effecting a high degree of positional accuracy and stability, and which will resist such external forces as shock and vibration which tend to alter the position or setting of the mechanism.

A further object of the invention has been to provide a mechanism, as aforesaid, which will be inexpensive to manufacture, and both inexpensive and easy to install.

A further object of the invention has been to provide a mechanism, as aforesaid, which will be extremely sturdy, capable of satisfactory performance over a long period of time under rigorous conditions of use, and which can be installed quickly and easily in many positions and under a wide variety of specific circumstances without the necessity of special equipment and with completely satisfactory results.

A further object of the invention has been to provide a mechanism, as aforesaid, utilizing relatively movable parts having frictionally engageable surfaces which can be readily adjusted for any ordinary installation and, when once adjusted, will be under sufficient frictional engagement that the control will be positive and firm, and will strongly resist all external forces, such as vibration and wind forces, tending to effect undesired displacement.

A further object of the invention has been to provide a mechanism, as aforesaid, which will be unaffected by all ordinary temperature variations to which it may be subjected and which will be able to absorb wear and similar external effects without becoming either excessively loose or excessively tight.

A further object of the invention has been to provide a mechanism, as aforesaid, which is adapted to mass production techniques, particularly because a single production model can be readily modified for a wide variety of specific installations, without loss of diminution or the foregoing named advantages.

A further object of the invention has been to provide a mechanism, as aforesaid, wherein the controlled element is a rearview mirror for an automotive vehicle, and said controlled element has resilient means which will yield to externally imposed shocks after which it will then return the controlled element to its original adjusted position.

A further object of the invention has been to provide a mechanism, as aforesaid, including a mounting for the controlled element, such as a rearview mirror, whereby vibrations transmitted thereto will either be effectively damped, or converted into movement which does not materially reduce the utility of the element.

Other objects and purposes of the invention will be apparent to persons acquainted with equipment of this general type upon reading the following disclosure and inspection of the accompanying drawings, in which:

Figure 1 is a top plan view of a remotely controllable rearview mirror for an automotive vehicle embodying the invention.

Figure 2 is a sectional view substantially as taken along the line II—II of Figure 1.

Figure 3 is a broken sectional view substantially as taken along the line III—III of Figure 1.

Figure 4 is a sectional view taken along the line IV—IV of Figure 3.

Figure 5 is a sectional view taken along the line V—V of Figure 3.

Figure 6 is a sectional view taken along the line VI—VI of Figure 3.

Figure 7 is a sectional view taken along the line VII—VII of Figure 3.

Figure 12 is a central cross-sectional view of another form of actuating device for the remote control mechanism characterizing the invention.

Figure 13 is a sectional view taken along the line XIII—XIII of Figure 12.

Figure 14 is a central cross-sectional view of a further type of actuating device for the remote control mechanism characterizing the invention.

Figure 15 is a sectional view taken along the line XV—XV of Figure 14.

Figure 16 is a sectional view taken along the line XVI—XVI of Figure 14.

Figure 8:
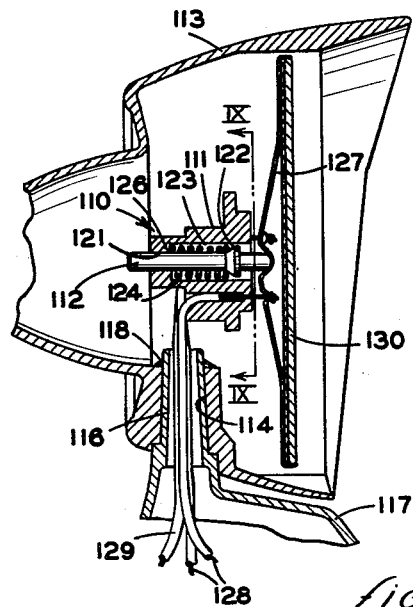
Figure 8 is a central cross-sectional view, similar to that shown in Figure 3 and showing a modified type of rearview mirror structure.

For convenience in description, the terms, "front," "rear" and derivatives thereof, will have reference to the leftward and rightward ends, respectively, of the structure characterizing the invention and as appearing in Figure 1. The terms, "inner," "outer," and derivatives thereof, will have reference to the geometric center of said structure characterizing the invention and parts associated therewith.

*General description*

The invention consists broadly of providing a remote control mechanism, primarily for an automotive mirror assembly, utilizing at least three cables to connect a controlling unit to a controlled unit, each cable being encased within an individual tube by which such cable is guided. Said cables are connected between the controlling and controlled units in such a manner that they are held under substantial resiliently applied tension, while the tubes are connected between such units in such a manner as to be subjected to substantial resiliently applied compression. Further, there are provided suitable surfaces of partially spherical shape which are movable with respect to each other when the mirror changes position and are resiliently urged into frictional engagement with each other. Thus, while the mirror can be easily moved with respect to its mounting in response to operation of the controlling element, the imposition of such random forces as result from vibrations or wind forces on the assembly will not effect any appreciable change in the positional relationships existing between the mirror and the automotive device on which it is mounted.

While the control apparatus of the present invention is applicable to a wide variety of uses, the particular commercial need giving rise to the invention lies, as above discussed, in the field of rearview mirrors for automotive use and the invention has been particularly characterized for this purpose. Thus, the description of the invention will proceed with the control mechanism applied to an automotive rearview mirror, but it will be understood that this specific use is for illustrative purposes and should not be construed as limiting.

*Detailed construction*

The remotely controllable rearview mirror assembly 10, shown in Figures 1, 2 and 3, will be described in detail for the purpose of illustrating one embodiment of the invention. However, it will be recognized that the invention can be characterized by remote control mechanisms having many variations in specific structure, several of which will be briefly disclosed herein.

In general, the rearview mirror assembly 10 includes a mirror 11, a mirror housing 12, and a pedestal 13 for supporting the housing 12 upon a part, such as the fender 14, of an automotive vehicle. Said mirror assembly 10 also includes a remote control mechanism 16 whereby the mirror 11 may be remotely controlled, said mechanism including a controlling or master unit 17 and a controlled or slave unit 18.

The mirror housing 12 (Figures 1 and 2) which also houses the controlled unit 18 of the control mechanism 16, is generally circular in cross-section and has a rearwardly extending and downwardly opening channel-shaped mounting member 21 (Figures 3 and 6) into which the upper end of the pedestal 13 is snugly receivable. A pair of mounting screws 22 are slidably receivable through adjacent integral bosses 23 in the upper end of the pedestal 13 for threaded engagement with the web 24 of the mounting member 21. The pedestal 13 is in turn secured upon the fender 14 by means of the stud 26, which is secured to, and extends downwardly from, the pedestal 13 through an opening in the bracket 27 for threaded engagement by a nut 28. Said bracket is secured to the underside of, or is integral with, said fender 14.

The controlled or slave unit 18 (Figures 3, 6 and 7) of the remote control mechanism 16 includes an upright mirror suport post 31 having at its lower end a downwardly extending flange 32 and frontwardly extending flange 33 which is preferably approximately perpendicular to, and spaced upwardly from the lower edge of, the downwardly extending flange 32. The downward flange 32 is slidably and snugly receivable into a groove 34, provided in the upper surface of the pedestal 13, when the frontward flange 33 is disposed between the upper surface 36 of said pedestal 13 and the web 24 of the mounting member 21. A suitable cable casing slot 37 is provided in the frontward flange 33 for alignment with the cable casing slots 38 and 39 in the web 24 and upper surface 36 of the pedestal 13, respectively. The mounting screws 22 cooperate with the groove 34 to hold the mirror support post 31 in the desired position.

The upper end of the mirror support post 31 (Figures 3 and 7) has an integral sleeve 42 with a lengthwise opening 43, which is preferably coaxial with the central lengthwise axis of the mirror housing 12. A support pin 44, having an enlarged and substantially hemispherical pivot head 46 on its rearward end, is slidably disposed within the opening 43 in said sleeve 42. The upper end of the support post 31 is provided with a pair of spaced slots 47 and 48, the lower ends of which are approximately equidistant from the axis of the sleeve opening 43. The support post 31 also has a keyhole-shaped opening 49, the slot 51 at the lower end of which is spaced from the axis of the sleeve opening 43 the same distance as the lower ends of the slots 47 and 48. The lower ends of the slots 47, 48 and 51 are preferably uniformly spaced around, and with respect to, the axis of the opening 43 in the sleeve 42. Three integral cable guides 52, 53 and 54 extend frontwardly from the support post 31 below, and adjacent to, the slots 47, 48 and 51, respectively, and curve downwardly at their frontward ends.

The mirror 11, which is circular in this particular embodiment, has a back plate 56 with a central portion 57 which arches away from the corresponding portion of said mirror. The central portion 57 of said back plate has a frontwardly opening, substantially hemispherical recess 58, the center of which is preferably along the axis of the circular mirror 11, for snug pivotal reception of the pivot head 46. Said central portion 57 of the back plate has three relatively small cable openings 59 (Figure 3) which are preferably equally spaced from, and around, the center of the recess 58, and preferably alignable with the lower ends of the slots 47, 48 and 51, respectively.

Three control cables 61, 62 and 63, which may be fabricated from woven metallic wire, have one end of each extending through the three cable openings 59, respectively, such ends being anchored, as by knotting and/or soldering, upon the back plate 56, in the space between the arched portion 57 thereof and said mirror. Said cables 61, 62 and 63, extend, respectively, through the slots 47, 48 and 51, and then into the cable casings 65, 66 and 67, respectively. The cable casings abut against the frontward side of the mirror support post 31 from which they extend around the cable guides 52, 53 and 54, respectively, and downwardly through the casing slots 37, 38 and 39. A spiral spring 68 is sleeved upon the support pin 44 between the pivot head 46 and the adjacent side of the post 31. Accordingly, the spring 68 tends to pull the cables 61, 62 and 63 through the slots 47, 48 and 51. The cables 61, 62 and 63, and their enclosing casings 65, 66 and 67, respectively, extend from the controlled unit 18 to the controlling unit 17.

The controlling or master unit 17 (Figures 3, 4 and 5) is comprised of a control base 71 having spaced front and rear members 72 and 73, which are interconnected by the three substantially parallel and uniformly spaced posts 74. The rear member 73 has in its front face a recess 76, which defines a segment of a sphere, and a conically shaped, central opening 77 which extends and diverges from the central portion of the recess 76 through the rearward end of said rear member 73. The axis of the opening 77 preferably extends through the center of curvature of the recess 76. Said rear member 73 has an external flange 78 and is externally threaded substantially from said flange 78 to the rearward end of the member 73. The threaded end 79 of the rear member 73 extends through an appropriate opening in a bracket 81 by means of which said controlling unit 17 may be mounted within the driver compartment, as on the instrument panel (not shown) of an automotive vehicle. A nut 82 engageable with the threaded portion 79 secures the control base 71 with respect to the bracket 81.

The control element 83 (Figures 3 and 5) is comprised of a pivot member 84 having a hemispherical surface 85 snugly and pivotally disposed within the spherical recess 76. An actuating post 86, which extends through the conical opening 77, is secured, as by threaded engagement, to the pivot member 84 for effecting pivotal movement thereof within the recess 76. The pivot member 84 has three integral and radially extending ears 87 (Figure 5) preferably uniformly spaced about the periphery of said pivot member 84 and equidistant from the actuating post 86.

The front member 72 has a central opening 91 (Figures 3 and 4) in which an elongated pressure pin 92 is axially slidably disposed. The pin 92 has at its rearward end an enlarged, substantially hemispherical head 93 which is received into a substantially hemispherical recess 94 in the front face 96 of the pivot member 84. The center of curvature of the recess 94 is coincident with the center of curvature of the hemispherical surface 85 on the pivot member 84. The pressure pin 92 is encircled by a spiral spring 97 between the front member 72 and the head 93, thereby causing the pin 92 to hold the pivot member 84 snugly but movably within the recess 76, said pivot member 84 being pivotally movable by the post 86 about said head 93 and within said recess 76. The spring 97 will be of materially greater strength than that of the spring 68 in order to overcome any tendency for the spring 68 to act through the wires 61, 62 and 63 and draw the surface 85 of the pivot member 84 away from the surface of the recess 76. Instead, the spring 68 provides an effective frictional engagement between the mutually contacting surfaces of the pivot head 46 and the recess 58, and the spring 97 provides an effective frictional engagement between the mutually engaging surfaces of the pivot member 84 and the recess 76.

The front member 72 (Figure 4) has three radially disposed, uniformly spaced guide slots 98 in the periphery thereof which are equidistant from the center of the central opening 91. Said guide slots 98 are alignable with the guide slots 99 in the ears 87 on the pivot member 84. Said guide slots 98 have front portions 101 of enlarged cross-section into which the cable casings 65, 66 and 67 are respectively received. The cables 61, 62 and 63 extend rearwardly beyond the front member 72 and are received into openings 102 in the end elements 103, having enlarged rearward ends 104 which are pivotally held within the slots 99 in said ears 87. The cables 65, 66 and 67 are held within their respective end elements 103 by any convenient means, such as soldering or compressing the side walls of the element against the portion of the cable disposed within the opening 102. However, before such fixing occurs the cables are pulled through their respective end elements 103, thereby putting a tension on the cables and putting their corresponding casings under compression. This provides further interacting frictional surfaces for purposes appearing below. It will be observed that the tensioning of any one of the cables 61, 62 and 63, with the resultant compression of the respective cable casings 65, 66 and 67, respectively, can be accomplished independently of the other cables and casings. However, when such tensioning is complete in this particular embodiment, both spiral springs 68 and 97 will be under compression.

It will be apparent from Figure 3 that in this particular embodiment the radial distance from the control ends of the cables to the center of pivoting of the control member is greater than the corresponding distance from the mirror ends of the cables to the center of rotation of the mirror. Thus, it is evident that in this embodiment a given angular movement of the control element will produce a somewhat large angular movement of the mirror.

*Operation*

The rearview mirror assembly 10 (Figures 1 and 3), to which this invention relates, may be provided with the remote control mechanism 16 completely assembled and ready for immediate use. However, under normal circumstances, the control mechanism 16, as well as the controlling unit 17 and the controlled unit 18, will be assembled upon the apparatus, such as an automotive vehicle, with which it is used. In such case, the cables 61, 62 and 63, will normally be mounted at one end of each upon the back plate 56 of the mirror 11, as described hereinabove. The corresponding ends of the cable casings 65, 66 and 67 will be abutted against the mirror support post 31, and the pivot head 46 will be disposed within the recess 58 (Figure 3). Said cable casings 65, 66 and 67 will extend downwardly through the slots 37, 38 and 39 in the flange 33, web 24 and upper surface 36 of said pedestal 13, respectively. The support post 31 and mirror housing 12 are then mounted upon the pedestal 13, after which they are secured with respect to each other by the mounting screws 22, as shown in Figure 3. The cable casings are extended through an appropriate opening in the fender 14, upon which the pedestal 13 is mounted by means of the stud 26, bracket 27 and nut 28, as shown in Figure 2. Said cables and cable casings are then looped from the position of the pedestal 13 to the point within the vehicle, not shown, where it is desired to have the controlling unit 17.

The rear ends of the cable casings 65, 66 and 67 are inserted into the enlarged portions 101 of the guide slots 98 in the front member 72. The cables 61, 62 and 63 extend through and beyond the guide slots 98 and the end elements 103 are sleeved upon said cables. The pressure pin 92 and associated pivot member 84 are positioned, as shown in Figure 3, with respect to the front member 72 and the spiral spring 97 is compressed by pressing the pivot member 84 toward the front member 72. The cables 61, 62 and 63 are locked within the end elements 103 after which said end elements 103 are placed within their respective guide slots 99. Finally, the pivot member 84 is released and the parts assume the positions and relationships above described and the resiliently applied friction between the several contacting and respectively movable surfaces above described give the desired positional stability to the mirror 11. The mirror can, however, be easily moved by movement of the actuating post 86 as desired. However, such stability is sufficient to resist a displacement of the mirror 11 as a result of vibrations, shocks and wind effects produced by the normal operation of the vehicle with which the rearview mirror assembly 10 is associated. Vibrations in the fender 14 may be transmitted through the pedestal 13 and the mirror support post 31 to the mirror 11 by means of and through the pivot pin 44, the spring 68 and/or the cables 61, 62 and 63.

In response to such vibrations, the mirror will tend to move either transverse of or parallel with the axis of the support pin 44. The portion of such movement which is transverse of the axis of the pin 44 will be damped by the frictionally engaging surfaces above mentioned, especially the surfaces between pivot head 46 and the recess 58 and the surfaces between the pivot member 84 and the recess 76, and this will minimize movement of the mirror about either a horizontal or a vertical axis with respect to the support post 13. However, if the shocks are so great as to cause a compression of the spring 68 and a corresponding pivotal movement of the mirror with respect to the post, said spring will immediately tend to return the mirror to the initial position. In such case, the initial position will comprise one dwell in the oscillation of the mirror.

The portion of the vibrational movement of the mirror which is a direction substantially parallel with the axis of the pivot pin 44 will be substantially damped before it reaches the mirror 11 by the spiral spring 68. Further, the triangular location of the cable openings 59 in the back plate 56 is such that, when combined with the cushioning effect of the spiral spring 68, the mirror 11 will always return to the same position which it had prior to the compression of the spring 68. This appears to be primarily due to the fact that the mirror 11 is not positively secured with respect to the post 31 in the usual manner. That is, the mirror 11 can be moved completely out of its desired position by pressing against one edge of its front surface and, when released, it will immediately return to its original position, due to the resilient action of the springs 68 and 97 and the positioning action of the cables 61, 62 and 63.

However, even if the mirror 11 is moved out of its desired position by a violent shock, repositioning of such mirror into its desired position can be quickly and easily effected by manual operation of the actuating post 86 which is conveniently located in the driver's compartment. By the same token, when a driver commences operation of the vehicle having a mirror assembly 10 following its use by a person of different physical characteristics or performances, the mirror 11 can be quickly adjusted to the demands and desires of the new driver by a simple movement of the conveniently located actuating post 86. Accordingly, there is no reason for the driver to move away from his driver's position for the purpose of properly positioning or adjusting the mirror assembly 10, regardless of what conditions may necessitate such positioning. Furthermore, the improved mounting of the apparatus greatly inhibits the transfer to the mirror of vibrations from vehicle operation. Furthermore, such vibration as does reach the mirror either does not remove the mirror appreciably from the plane producing a proper image, or it is controlled by the springs 68 and 97 in cooperation with the cables 61, 62 and 63 to cause one of the dwells in such vibration to occur at a point where the image in the mirror is in its desired position.

*Alternate structures*

The alternate controlled unit 110 (Figure 8) differs from the controlled unit 18 of Figure 3 primarily in the mirror support post 111 and the support pin 112. In this particular embodiment, the mirror housing 113 has a downwardly diverging opening 118 in its lower end into which the tapered post 116 on the pedestal 117 is snugly received. Means, such as the snap ring 118 which encircles the upper end of the post 116, holds the housing 113 with respect to the pedestal 117.

Figure 9:
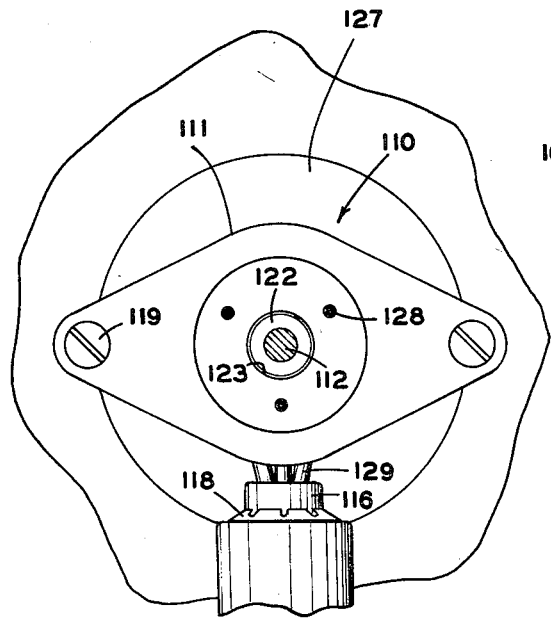
Figure 9 is a sectional view taken along the line IX—IX of Figure 8.

As shown in Figure 9, the support post 111 is mounted by means such as the screws 119 upon the mirror housing 113 and is provided with a central opening 121 in which the support pin 112 is axially slidably disposed. The support pin 112 has an annular flange 122 between the ends thereof which flange is slidably disposed within an enlarged rearward portion 123 of the central opening 121. A spiral spring 124, which is disposed between the annular flange 122 and the shoulder 126 at the inner end of the enlarged portion 123, tends to urge the pin 112 out rearwardly from the central opening 121. The rearward rounded end of the pin 112 is received into a recess in the back plate 127 on the mirror 130 in substantially the same manner as set forth hereinabove in detail with respect to the assembly 10 shown in Figure 3. Cables 128 disposed within cable casings 129 engage the back plate 127 in a manner similar to, and for the same purposes as, those set forth hereinabove with respect to the cables 61, 62 and 63, of Figure 3.

The alternate controlling or master unit 132 (Figure 10) has a control base 133 comprised of a front member 134 and a rear member 136. The rear member 136 is a hollow, substantially cylindrical shell having an annular external flange 137 between its ends and having its rearward end provided with an inwardly curving surface 138 defining a segment of a sphere. The rear member 136 is externally threaded adjacent to, and rearwardly of, the annular flange 137 for threaded engagement by means, such as a nut 139, after said threaded portion has been inserted through an opening in an appropriate panel 141, which may be the instrument panel of an automotive vehicle.

The front member 134 (Figure 10) includes a mounting blocks 142 having an integral, rearwardly extending sleeve 143 which is slidably receivable within the cavity 144 in the front end of the rear member 136. A spiral spring 146 encircles the front portion of the rear member 136 between the annular flange 137 and the mounting block 142 on the front member 134, whereby said front and rear members are resiliently urged away from each other. Said mounting block 142 has three cable openings 147 uniformly spaced with respect to each other and the axis of the sleeve 143. Three cables 148 extend through said cable openings which communicate with the interior of said sleeve 143 and are enlarged at their front ends for reception of cable casings 149.

Figure 11:
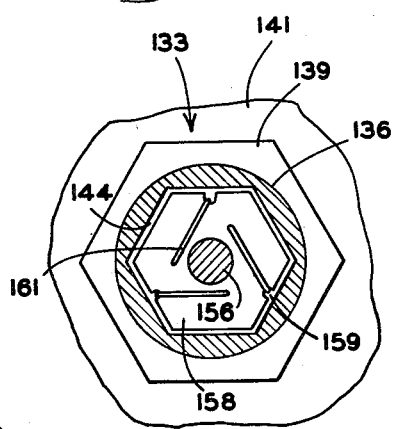
Figure 11 is a sectional view taken along the line XI—XI of Figure 10.

The pivot member 151 includes an outer actuating element 152 provided at one end with a curved flange 153 defining a segment of a sphere. Said flange 153 has a correspondingly curved recess 154 for snug pivotal reception of the spherical surface 138 on the rear member 136. Said pivot member 151 also includes a control pin 156 having a threaded end which is threadedly received into a threaded opening 157 in the front end of the actuating element 152, which opening extends through the curved recess 154. Said control pin 156 has a large integral flange 158 which passes through the center of curvature of said recess 154 and has three uniformly spaced notches 159 (Figure 11) in its periphery, which are alignable with the cable openings 147 in and through the mounting block 142. The end portions 161 of the cables 148, which extend through the sleeve 143 into the cavity 144, where the flange 158 is situated, are received into the notches 159 and are bent over against the rearward surface of the flange 158 where they may be held in position by any convenient means, such as brazing.

Figure 10:
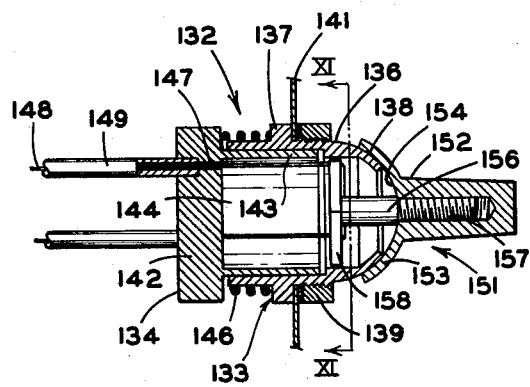
Figure 10 is a central cross-sectional view of a modified actuating device for the remote control mechanism characterizing the invention.

During the assembly of the alternate controlling unit 132, the cables 148 are drawn through the cable openings 147 in the mounting block 142 until the cable casings 149 are snugly disposed within the enlarged portions of the cable openings 147, as shown in Figure 10. The flange 158 on the control pin 156 is then moved into the sleeve 143 with the end portions 161 of the cables 148 disposed within the notches 159 in said flange 158. After said end portions are fixed in position upon the flange 158, the rear member 136 is mounted upon the sleeve 143 with the spiral spring 146 disposed between the flange 137 and said mounting block 142. The threaded portions of the control pin 156, which extends through the opening at the rearward end of the rearward member 136, are threadedly engaged with the actuating element 152, whereby the control pin 156, the flange 158 and the cables 148 are drawn toward the rearward end of the rear member 136. Ordinarily the front ends of the cables 148 are secured to means, such as the backplate 127 on the mirror shown in Figure 8. Thus, the threaded engagement between the actuating element 152 and the control pin 156 places the spring 146 and casings 149 under compression while placing the cables 148 under tension. Accordingly, a positive frictional engagement is created between the several engaging and respectively movable surfaces of the apparatus whereby the pivot member 151 and a mirror, such as shown in 130 in Figure 8, associated therewith, will be held in a selected position and will resist movement out of such position.

Another alternate controlling unit 166 (Figure 12) is comprised of a control base 167 having a mounting block 168 with an integral sleeve 169 extending from the rear end thereof. The mounting block 168 has a recess 171 in its rearward face, which recess communicates, and is substantially coaxial, with the cavity 172 in the sleeve 169. A support pin 173 is axially slidably disposed within the recess 171 and has an external flange 174 between the ends thereof. A spiral spring 176 is sleeved upon the pin 173 between the flange 174 and the adjacent wall 177 of the mounting block 168. Accordingly, the spring 176 urges the pin 173 out of the recess 171 and into the cavity 172.

A pivot member 178 (Figure 12) has an enlargement 180 at one end disposed within the cavity 172. A pivot plate 179, having a central, substantially hemispherical recess 181, is secured to the front end of the pivot member 178 so that the curved rearward end of the pin 173 is snugly and pivotally received into the curved recess 181. As shown in Figure 13, the enlarged end 180 of the pivot member 178 has three uniformly spaced, radially disposed grooves 183 which are substantially covered by the pivot plate 179. Said plate 179 has notches 184 in the periphery thereof, which are respectively aligned with the grooves 183. The mounting block 168 is provided with three uniformly spaced slots of which one appears at 186 in the periphery thereof which communicate with the cavity 172 and extend through the front face of said control base 167. Three cables 187 are slidably disposed within the slots 186 and extend into the cavity 172 where their end portions 188 are bent substantially at right angles to the remainder of the cable and inserted into the grooves 183 and corresponding notches 184. Means, such as solder or wedges, prevents accidental disengagement of said end portions 188 from the slots 186. Each of the cables 187 is slidably housed within a cable casing 189, one end of each of which is received into an enlarged portion of the respective slots 186.

The radially inner walls of the slots 186 converge, as shown in Figure 12, toward the frontward end of the control base 167. Accordingly, the cable casing 189 can be inserted into a single tubular housing 191 at a short distance from the front end of the control base 167.

In assembling the alternate controlling unit 166, the cables 187 are pulled through the cable casings 189 until the end portions 188 of said cables are rearwardly of the sleeve 169 where they can be inserted into the grooves 183. Said cables 187 are then pulled back through the cable casings 189 until the spiral spring 176 is placed under compression, thereby placing the cables 187 under tension and the several relatively movable surfaces in frictional contact with each other. The sleeve 169 has a portion of reduced diameter near its rearward end which produces the shoulder 192, and which is externally threaded. Accordingly, said sleeve 169 can be inserted through an opening in a panel 193, such as the instrument panel of a vehicle, after which the cap member 194 is threadedly mounted upon the sleeve 169 for holding the controlling unit 166 with respect to said panel 193. Said cap member has a central opening 196 through which the pivot member 178 extends and may be pivotally moved about the adjacent end of the support pin 173. The alternate controlling unit 166 is operated by moving the pivot member 178 for the purpose of positioning means, such as the mirror 130 shown in Figure 8, in substantially the same manner as set forth hereinabove with respect to the alternate controlling unit 132, disclosed in Figure 10.

The alternate controlling unit 201 (Figure 14) has a control base 202 comprised of a front member 203 and a rear member 204. The rear member 204 has a curved rearward surface 206 defining a portion of a sphere, and a central opening 207, the axis of which extends substantially through the center of curvature and the center portion of said surface 206. Said rear member 204 has an integral forwardly extending sleeve 208 of reduced outside diameter which provides an annular shoulder 211 around said rear member 204. The sleeve 208 (Figures 14 and 15), which has three relatively wide, uniformly spaced and axially aligned slots 212, is extendable through a similarly slotted opening in a panel 213, which may be the instrument panel of an automotive vehicle. Said panel 213 is secured with respect to the rear member 204 by means of screws 214, which extend into the shoulder 211.

The elongated cylindrical front member 203 (Figures 14 and 15) is slidably receivable into the sleeve 208 and is held against rotation with respect to said rear member 204 by means of the tongue and slot arrangements 216 (Figure 16). The rearward end of the front member 203 has a rearwardly converging conical recess 217 having its inner end forwardly of, but close to, the center of curvature of the curved surface 206. Said front member 203 also has a cable casing opening 218 in its front end which extends toward, but is spaced from, the conical recess 217 and communicates with the inner ends of three cable slots 219 in the side wall of the front member 203. The rear end walls 221 of the cable slots 219, which are uniformly spaced around the front member 203, are sloped rearwardly and outwardly for directing the cables 222 from the cable casings 223, disposed within the casig opening 218, around the rear edge 238 of the front member 203 and into the central opening 207 in the rear member 204.

The pivot member 224 is comprised of an actuating element 226 (Figure 14) having a curved flange 227 at the front end thereof which combines with the element 226 to provide a curved recess 228 defining a portion of a sphere. Said curved recess 228 has substantially the same radius of curvature as the curved surface 206 on the rear member 204 and is slidably engagable therewith. A control pin 229 slidably extends through a lengthwise opening 231 in the actuating element 226 and its rearward end is threaded for reception into, and engagement by, an internally threaded cap 232. Said control pin 229 has an external annular flange 233 which is disposed within the central opening 207.

A cable engaging ring 234 is sleeved upon the control pin 229 adjacent to the rearward side of the flange 233, said ring extending radially outwardly beyond the outer edge of said flange 233. Three notches 236 are provided in the periphery of the ring 234 at uniform intervals therearound for the purpose of receiving the end portions 237 (Figure 16) of the cables 222, said end portions being secured to the rearward side of the ring 234 in any convenient manner, as by brazing. The cable ring 234 is somewhat smaller in diameter than the adjacent end of the front member 203. Accordingly, said cables curve around the rearward rounded edge 238 of the front member 203 after emerging from the slots 219 to be secured to the cable ring 234.

The forward end of the control pin 229 (Figure 14) is engaged by the wall of the conical recess 217 so that said pin is restricted to pivotal movement about the center of curvature of the surface 206. Such pivotal movement, which is completely compatible with the engagement between the curved surfaces 206 and 228, permits controlled movement of the cables 222 within their cable casings 223.

The alternate controlling unit 201 is assembled by placing the frontward end of the control pin 229 into the conical recess 217 and then drawing the cables 222 firmly around the rounded edge 238 of the front member 203 after said cables have been threaded through the cable slots 219 with the cable casings 223 snugly disposed within the cable opening 218. The end portions 237 of each such cable are then inserted into the notches 236 on the cable ring 234 and thereafter secured to the rearward surface of said cable ring. The cables and cable casings may, if desired, be housed within a tubular conduit 239, which extends from the controlling unit 201 to a controlled unit, such as that shown in Figure 8, for example.

Although several preferred embodiments of the invention have been disclosed in detail hereinabove for illustrative purposes, it will be understood that variations or modifications of such disclosure, which lie within the scope of the appended claims, are fully contemplated.

I claim:

1. Mechanism for remotely controlling the pivotal movement of a member about a first pivot point comprising: a support element engaging said member and supporting same for universal pivoting movement about a first pivot point; stationary support means supporting said element for movement toward and away from said member; a control base spaced from said support means; three cable casings extending between said support means and said control base; three cables respectively extending through said cable casings, one set of adjacent ends of said cables being secured to said member at three points thereon spaced outwardly from said support element and said first pivot point and spaced from each other around said pivot point; resilient means between said support element and said support means urging said support element toward said member and thereby urging said ends of said cables away from said casings, said resilient means being positioned to apply its force against said member substantially through said first pivot point so that said resilient means simultaneously and equally tensions all of said cables in all positions of said member and said control element; a control element pivotally supported upon said control base for universal movement about a second pivot point; and means on said control element secured to the other set of adjacent ends of said control cables at points spaced from each other and from the second pivot point, said cables being held under tension by said resilient means.

2. A mechanism for remotely controlling the pivotal movement of a member through a plurality of positions about a first pivot point, comprising: support means pivotally supporting said member for movement about said first pivot point; at least three cables having one group of adjacent ends secured to said member at points thereon substantially spaced from each other and from said first pivot point; control means spaced from said member and secured to the other adjacent ends of said cables for effecting selective movement of said cables with respect to said support means; and resilient means positioned for applying a force coincident with said first pivot point and parallel with one group of adjacent ends of said cables for holding said cables under substantially equal tension between said member and said control means in all of said positions.

3. Control means applicable especially to an automotive rear-view mirror having supporting means comprising in combination a support element supported upon said support means; a ball and socket joint between said support element and said mirror and pivotally supporting said mirror for universal movement about a first pivot point; a control base mountable a fixed distance from said support means; a control element pivotally supported upon said control base for universal movement about a second pivot point spaced from said first pivot point; at least three relatively stiff cable casings extending between said support means and said control base; a control cable extending through each one of said cable casings, one group of adjacent ends of the cables being secured to said mirror at points spaced substantially equally from each other and from said first pivot point, the other group of ends of said cables being secured to said control element at points substantially equally spaced from each other and from said second pivot point; and resilient means acting between said support means and said mirror substantially at the point of contact between said support element and said mirror and urging said mirror in opposition to said control cables whereby substantially equal tension is placed on all of said control cables in all positions of said mirror and said control element.

4. The structure of claim 3 wherein said support element is an elongated pin movable with respect to said support means and having an enlarged hemispherical head at one end thereof, said mirror having a cooperating, substantially hemispherical recess within which said head is received whereby said mirror is supported for universal movement; and wherein said resilient means includes a spring disposed between said head and the adjacent surface of said support means.

5. The structure of claim 3 wherein said control base comprises: first and second spaced parts fixed with respect to each other, said first part having a central opening therethrough, the axis of which intersects said second part; said control element comprising a manually operable control element extending through said central opening and having an enlarged, partially spherical portion disposed between said first and second parts; three cable guides in said second part uniformly spaced with respect to each other and said axis, and fixed to said cable casings, respectively, the three cables being engaged by said guides and connected at the adjacent ends of each upon the enlarged portion of said control element at points substantially uniformly spaced from each other and said axis, the other ends of said cables being connected in a similar pattern to said mirror; and a resiliently backed element supported upon said second part and pivotally supporting the enlarged portion of said control element for universal pivotal movement, whereby pivotal movement of said control element with respect to said backed element effects a corresponding pivotal movement of said mirror.

6. The structure of claim 3 wherein said control base comprises: a pair of axially slidable, telescoping sleeves, the inner sleeve having a mounting block at its outer end, and the outer sleeve having a partially spherical surface remote from said block and an external flange; a manually engageable control element extending through said spherical surface and supported thereon for universal pivotal movement about a point within said outer sleeve, said control element having an enlarged portion near said pivot point; at least three uniformly spaced cable openings through said block, one of said cables extending through each of said cable openings and into said inner sleeve and connected at one end of each to said enlarged portion at points uniformly spaced from each other and said pivot point, the other ends of said cables being connected in a similar pattern to said mirror; and resilient means between said flange and said block urging said sleeves apart.

7. The structure of claim 3 wherein said control base comprises: a mounting block having an integral sleeve; a manually operable control element extending into said sleeve and having an enlarged, partially spherical portion within said sleeve; at least three uniformly spaced slots in said block communicating with said sleeve, one of said cables extending through each of said slots, respectively, and into said sleeve and connected at one end of each to said enlarged portion at points uniformly spaced from each other and the center of said portion, the other ends of said cables being connected in a similar pattern to said mirror; and a resiliently backed element slidably supported upon said block and extending within said sleeve and pivotally supporting said enlarged portion near said center thereof.

8. The structure of claim 3 wherein said control base comprises: a first part having a central opening, an integral, coaxial sleeve at one end thereof and a partially spherical surface at the other end thereof; a second part extending into said sleeve, said second part having recesses in the inner and outer ends thereof and at least three uniformly spaced slots in the sidewall communicating between the outer end recess and said central opening; a manually operable control element extending through said central opening into said inner recess, said control element being pivotally supported upon said first part for universal movement about a point in said inner recess; and a flange on said control element within said central opening, said cables extending through said outer recess, said slots and into said central opening and connected at their adjacent ends to said flange at points uniformly spaced from each other and said pivot point, the other ends of said cables being connected in a similar pattern to said mirror.

9. A remotely controllable rearview mirror construction mountable upon, and spaced from the driver's position in, an automobile vehicle, comprising: a mirror; backing structure on said mirror having a partially spherical recess therein on the side thereof remote from said mirror, said recess not exceeding about a hemisphere in extent; a support means mountable in a fixed position on the vehicle; a support pin slidably received through said support means and extending transverse to the plane of said mirror, said pin having a partially spherical head freely movably received within said recess whereby said mirror is supported for universal movement with respect to said pin about a first point; a coil spring under compression surrounding said support pin and bearing at one end thereof against said support means and bearing at the other end thereof against said support pin whereby said support pin and said mirror are urged away from said support means, a control base mountable within the driver's compartment of said vehicle, said control base including a first part and a control knob and means mounting said control knob for universal movement about a second point and for movement toward and away from said first part; spring means normally urging said control knob away from said first part, three cables and a casing surrounding each of said cables, means securing one set of corresponding ends of said cables to said backing structure equally spaced from each other and from said first point, the corresponding ends of said cable casings being fixed with respect to said support means; means fixing the other set of corresponding ends of said cables to said control knob equally spaced from each other and from said second point, the corresponding ends of cable casings being fixed with respect to said first part whereby said coil spring and said spring means maintain said cables under tension and said cable casings under compression.

10. A mechanism for remotely controlling the pivotal movement of a member about a pivot point through a plurality of positions comprising: support means pivotally supporting said member for movement about said pivot point; at least three cables having one group of adjacent ends secured to said member at points thereon spaced from each other and from said pivot point; control means spaced from said member and secured to the other adjacent ends for effecting selective movement of said cables with respect to said support means; and said support means including resiliently actuated means operably connected at said pivot point to said member for holding said cables under substantially equal tension between said member and said control means in all of said positions.

11. A mechanism for remotely controlling the pivotal movement of a member about a pivot point through a plurality of positions comprising: support means pivotally supporting said member for movement about said pivot point; at least three cables having one group of adjacent ends secured to said member at points thereon spaced from each other end and from said pivot point; contrtol means spaced from said member and secured to the other adjacent ends for effecting selective movement of said cables with respect to said support means; and a single coil spring concentric with and connected substantially at said pivot point to said member and thereby effective at the first-named ends of said cables for holding said cables under substantially equal tension between said member and said control means in all of said positions.

12. Mechanism for remotely controlling a member universally movable from a median position, comprising in combination: a base; mounting means supported on said base; support means on said member engaging said mounting means and supporting said member for universal movement about a center point; a single constantly stressed coil spring concentric with and connected substantially at said center point to said member and urging said member in one lineal direction with respect to said base; a plurality of cables affixed to said member at points spaced from the center point of said universal movement, from said resilient means and from each other and limiting movement of said member away from said base; a control member arranged for moving said cables longitudinally with respect to each other and for simultaneously in all positions thereof limiting their movement toward said member in response to said urging; whereby said coil spring will urge said member away from said base and said cables will limit the movement of said member in response to said urging and whereby also said cables will by said coil spring be continuously held under substantially equal tension in all positions thereof.

13. Mechanism for remotely controlling the pivotal movement of a member about a first pivot point comprising: a mounting base; support means supporting said member for universal movement about said first pivot point and including stressed resilient means acting against said member substantially at said first pivot point for resiliently urging said member away from said mounting base; a control base spaced a fixed distance from said mounting base; a plurality of cables respectively extending from said control base to said member, the ends of said cables adjacent said member being secured thereto at points thereon spaced from said first pivot point and from each other, the resilient urging of said member away from said mounting base drawing said cables away from said control base and said cables resisting movement of said member away from said mounting base in response to said urging; a control element pivotally supported upon said control base for universal movement with respect thereto; manually operable means on said control element secured to the other ends of said control cables for effecting relative longitudinal movement of said cables while simultaneously and in all positions resisting said drawing, said cables being each thereby held under substantially equal tension by said resilient means.

14. Control means, especially for an automotive rear-view mirror, comprising in combination: support means; a support element supported upon said support means; a ball and socket joint between said support element and said mirror and pivotally supporting said mirror for universal movement about a first pivot point; a control base mountable at a fixed point spaced from said support means and a control element pivotally supported upon said control base for universal movement about a second pivot point spaced a fixed distance from said first pivot point; at least three control cables extending from said control element to said support element, one group of adjacent ends of said cables being secured to said mirror at point spaced from each other and from said first pivot point and the other group of ends of said cables being secured to said control element at points spaced from each other and from said second pivot point; and resilient means acting between said support means and said mirror and acting against said mirror substantially at the point of contact between said support element and said mirror through said ball and socket joint and urging said mirror in opposition to said cables whereby substantially equal tension is placed upon all of said cables in all positions of said mirror and said control element.

15. The structure of claim 14 wherein the points of engagement of the two groups of ends of said cables lie, respectively, substantially within two spaced planes and one group of said ends is spaced radially from their associated pivot point a different distance than the corresponding spacing of the other group of ends with respect to their associated pivot point, said planes being in constantly differing angular relationships with respect to each other as said control element moves from one position to another.

16. The device defined in claim 14 where said control base comprises a control-supporting member having a partially spherical, first curved, surface thereon, and a manually-operable control element having a second, partially spherical, surface therein interfitting snugly with said first spherical surface, said three cables being affixed to said manually controllable member at points spaced from each other and from the center of said second, partially spherical, surface and means fixedly mounted with respect to said control-supporting member for mounting same in a desired position; whereby tension supplied to said cables from said resilient means will urge said partially spherical surfaces snugly together.

17. The device defined in claim 14 wherein said control base comprises a control supporting member having a partially spherical, convexly curved, surface thereon and said member further having a plurality of cable guide openings therethrough, and a manually-operable control element having a concave, partially spherical, surface therein fitting snugly against said convex spherical surface, said three cables extending through said cable guide openings and being affixed to said manually controllable member at points spaced from each other and from the center of sair concave, partially spherical, surface and means fixedly mounted with respect to said control-supporting member for mounting same in a desired position; whereby tension supplied to said cables from said resilient means will urge said partially spherical surfaces snugly together.

18. The structure of claim 14 wherein the points of engagement of the two groups of ends of said cables lie, respectively, substantially within two spaced planes and one group of said ends is spaced radially from their associated pivot point a different distance than the corresponding spacing of the other group of ends with respect to their associated pivot point, said planes being in constantly differing angular relationships with respect to each other as said control element moves from one position to another, casing means surrounding said cables and extending between said support means and said control base, the length of said casings being so proportioned with respect to the distance between said control base and said support means that said casings are held against longitudinal movement.

19. Mechanism for remotely controlling a member universally movable from a median position comprising: a base; a pin slidably mounted within said base; a support for said member having a recess therein receiving said pin and universally movable with respect to said pin; resilient means urging said pin away from said base; at least three cables affixed to said support at points substantially equally spaced from said pin and from each other and movable with said support in response to said urging, said cables being placed under substantially equal tension by said resilient means; a control member arranged for moving said cables longitudinally with respect to each other and for limiting their movement toward said support in response to the urging of said resilient means; whereby said resilient means will urge said pin against said support and said cables will limit the movement of said support in response to said urging.

20. Mechanism for remotely controlling a controlled member, particularly an automotive rear-view mirror, for universal movement from a median position comprising; a base, means supported on and by said base for holding said member for said universal movement about a pivot point; at least three cables affixed to said member at points spaced from said pivot point and from each other and holding said member against said base; a control member arranged for universal movement about a second pivot point and connected for moving said cables longitudinally with respect to each other and resilient means applicable to one of said controlled member and said control member and operable substantially at that pivot point associated with said one of said controlled member and said control member for urging same away from the other thereof along an axis substantially parallel to the axis of said cables and thereby holding said cables under substantially equal tension in all positions of said controlled and control members.

21. Mechanism for remotely controlling a member universally movable from a median position, comprising in combination: a base; support means extending between said base and said member and supporting said member for lineal movement along an axis away from said base and for universal movement about a center point; stressed resilient means between said base and said member acting substantially at said center point for urging said member in one direction along said axis with respect to said base; a plurality of cables each affixed at one end thereof to said member at points spaced from said center point for resisting said urging and holding said resilient means in stressed condition; a control member connected to the other end of each of said cables for holding same in selected, but adjustable, fixed position, said cables being equally stressed by said resilient means as they urge said member in a direction opposite to said one direction and said member being held by said cables in snug engagement with said support means.

22. Remote control mechanism comprising in combination: a base; a first member; support means extending between said base and said first member supporting said first member for lineal movement along an axis extending away from said base and for universal movement about a first center point; stressed resilient means acting at said first center point between said base and said first member urging said first member with respect to said base in one direction along said axis; a plurality of elongated, flexible elements affixed at one end of each thereof to said first member at points thereon spaced equally from said center point; a second member; means mounting said second member for universal movement about a second center point spaced from said first center point, the other end of each of said elements being connected to said second member at points thereon spaced from said second center point, said elements being stressed by said resilient means so that they urge said first member in a direction opposite to said one direction whereby said first member is held in snug engagement with said support means.

23. Remote control mechanism for an automotive rearview mirror comprising in combination: a base, a first member; support means providing a pivotal bearing surface between said first member and said base effecting universal movement of said first member around a center point, said first member being lineally movable away from said bearing surface along an axis through said center point and extending away from said base; stressed resilient means acting substantially at said center point and between said base and said first member urging said first member with respect to said base in one direction along said axis; a plurality of flexible, elongated elements affixed at one end of each thereof to said first member at points thereon spaced from said bearing surface, said cables being substantially equally stressed by said resilient means in all positions of said first member with respect to said base so that they urge said first member in the opposite direction along said axis; a second member, means mounting said second member for universal movement about a second point spaced from said bearing surface, the other end of each of said flexible elongated elements being connected to said second member at points thereon spaced from said second point; manually operable means connected to one of said members for pivoting same and thereby causing corresponding movement of the other of said members; said elongated elements being continuously substantially equally stressed so that the other of said members is urged thereby to remain in whatever position it is placed by movement of said one member, said elements and said resilient means continuously urging said first member against said support means; and means mounting said mirror on one of said members.

24. Mechanism for the controlling of a first member for universal movement about a first center point comprising: a base; support means supporting said first member for lineal movement along an axis extending away from said base and for universal movement about said first center point, said support means including a stressed coil spring extending between said base and said first member and being concentric with said first center point and urging said first member with respect to said base in one direction along said axis, and a plurality of elongated, flexible elements affixed at one end of each thereof to said first member at points thereon spaced equally from said center point and at distances from said center point substantially greater than the largest radius of said coil spring; a second member; means mounting said second member for universal movement about a second center point spaced from said first center point, the other end of each of said elements being connected to said second member at points thereon spaced from said second center point, said elements being stressed by said coil spring so that they urge said first member in a direction opposite to said one direction; and manually operable means operably connected to one of said members for acting through said flexible elements to actuate the other of said members.

References Cited in the file of this patent

UNITED STATES PATENTS

| 430,632 | Doremus | June 24, 1890 |
| 893,274 | Starrett | July 14, 1908 |
| 1,270,163 | Jesurun et al. | June 18, 1918 |
| 1,499,640 | Copeland | July 1, 1924 |
| 1,542,259 | Macy | June 16, 1925 |
| 1,630,217 | Rasor | May 24, 1927 |
| 1,694,477 | Long | Dec. 11, 1928 |
| 1,740,909 | Shaw | Dec. 24, 1929 |
| 2,373,745 | Conway | Apr. 17, 1945 |
| 2,545,258 | Cailloux | Mar. 13, 1951 |
| 2,573,127 | Von Bredow | Oct. 30, 1951 |
| 2,656,764 | Johnson | Oct. 27, 1953 |
| 2,696,142 | Langford | Dec. 7, 1954 |
| 2,791,939 | Malachowski | May 14, 1957 |
| 2,855,825 | Feder | Oct. 14, 1958 |
| 2,874,588 | Thomas | Feb. 24, 1959 |

FOREIGN PATENTS

| 433,112 | Great Britain | Aug. 8, 1935 |

UNITED STATES PATENT OFFICE
CERTIFICATE OF CORRECTION

Patent No. 2,931,245                          April 5, 1960

Edwin B. Jacobson

It is hereby certified that error appears in the printed specification of the above numbered patent requiring correction and that the said Letters Patent should read as corrected below.

Column 4, line 57, for "suport" read -- support --; column 6, line 64, for "large" read -- larger --; column 8, line 73, for "blocks" read -- block --; column 11, line 10, for "casig" read -- casing --; column 14, line 52, strike out "end"; column 15, lines 7 and 8, for "eontinuously" read -- continuously --; line 48, for "point" read -- points --; column 16, line 9, for "control supporting" read -- control-supporting --; line 73, after "holding" insert -- each of --.

Signed and sealed this 25th day of October 1960.

(SEAL)
Attest:

KARL H. AXLINE                                                   ROBERT C. WATSON
Attesting Officer                                               Commissioner of Patents